(12) United States Patent
Nakamura et al.

(10) Patent No.: US 9,444,334 B2
(45) Date of Patent: Sep. 13, 2016

(54) DC/DC CONVERTER

(71) Applicant: Sanken Electric Co., Ltd., Niiza-shi, Saitama (JP)

(72) Inventors: Masaru Nakamura, Niiza (JP); Hiroaki Nakamura, Niiza (JP); Takayuki Konishi, Niiza (JP); Chie Isshi, Niiza (JP); Satoshi Nakamoto, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 14/471,351

(22) Filed: Aug. 28, 2014

(65) Prior Publication Data

US 2015/0084606 A1   Mar. 26, 2015

(30) Foreign Application Priority Data

Sep. 24, 2013  (JP) .................. 2013-196533
Sep. 24, 2013  (JP) .................. 2013-196535
Mar. 24, 2014  (JP) .................. 2014-059703

(51) Int. Cl.
*G05F 1/00*      (2006.01)
*H02M 3/156*     (2006.01)
*H02M 1/00*      (2006.01)

(52) U.S. Cl.
CPC ..... *H02M 3/156* (2013.01); *H02M 2001/0032* (2013.01); *H02M 2001/0035* (2013.01); *Y02B 70/16* (2013.01)

(58) Field of Classification Search
CPC .... H02M 3/145; H02M 3/155; H02M 3/156; H02M 2001/0032; H02M 2001/0035; H02M 3/1563; H02M 3/1566; H02M 3/157; H02M 3/158; H02M 1/08; H02M 1/083; H02M 1/32; H02M 1/36; H02M 2001/0009; H02M 2001/0025; H02M 2001/0038; H02M 2001/0041; Y02B 70/1466; Y02B 70/16
USPC ........ 323/222–226, 235, 236, 246, 271–277, 323/281–288, 299, 319, 351; 363/79, 363/123–127; 327/172–175, 589, 592; 375/237–239

See application file for complete search history.

(56) References Cited

U.S. PATENT DOCUMENTS 5,479,090 A * 12/1995 Schultz .................... 323/284
5,481,178 A    1/1996 Wilcox et al.
(Continued)

FOREIGN PATENT DOCUMENTS

JP    2007-020352 A    1/2007

*Primary Examiner* — Timothy J Dole
*Assistant Examiner* — Carlos Rivera-Perez
(74) *Attorney, Agent, or Firm* — Mots Law, PLLC

(57) ABSTRACT

The present invention includes: a zero crossing detection circuit which outputs a zero crossing signal when an inductor's regeneration period is completed; a light load detection circuit which compares an amplified error signal from an error amplifier and a threshold and outputs a light load signal; a timer circuit which outputs an intermittent operation enabling signal after a predetermined period based on the light load signal and zero crossing signal and outputs an intermittent operation disabling signal when the zero crossing signal is not outputted for a predetermined period; and an ON-OFF control controller which turns off a switching element when the amplified error signal falls below the threshold while the timer circuit is outputting the intermittent operation enabling signal, and turns on the switching element when the amplified error signal at least reaches or exceeds the threshold while the timer circuit is outputting the intermittent operation enabling signal.

14 Claims, 13 Drawing Sheets

(56) References Cited

U.S. PATENT DOCUMENTS

| | | | | |
|---|---|---|---|---|
| 5,697,074 | A * | 12/1997 | Makikallio | H03G 3/3047 330/141 |
| 6,828,766 | B2 * | 12/2004 | Corva | H02M 3/156 323/225 |
| 7,030,596 | B1 * | 4/2006 | Salerno et al. | 323/282 |
| 2001/0022512 | A1 * | 9/2001 | Tateishi | 323/282 |
| 2005/0212502 | A1 * | 9/2005 | Casey et al. | 323/284 |
| 2009/0146631 | A1 * | 6/2009 | Fukumori | 323/284 |
| 2009/0184701 | A1 * | 7/2009 | Yen | H02M 3/156 323/283 |
| 2011/0148379 | A1 * | 6/2011 | Gu et al. | 323/284 |
| 2012/0146599 | A1 * | 6/2012 | Oyama | H02M 3/1588 323/271 |

* cited by examiner

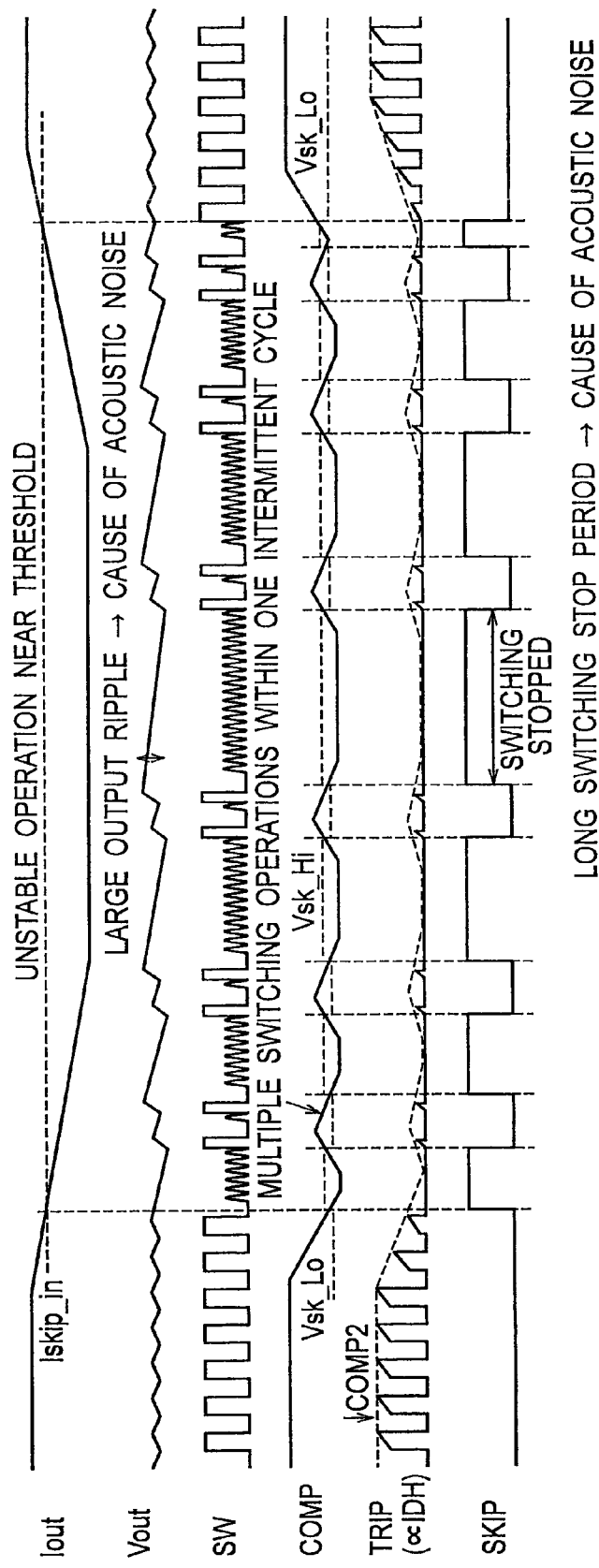

HIGH Vout (SMALL VOLTAGE DIFFERENCE BETWEEN Vin AND Vout)

LOW Vout (LARGE VOLTAGE DIFFERENCE BETWEEN Vin AND Vout)

AS Vout DROPS, Iskip_in RISES RAPIDLY

THRESHOLD DETERMINED BY DETECTION OF AMPLIFIED ERROR SIGNAL

THRESHOLD DETERMINED BY DETECTION OF ZERO CROSSING

FIG. 12 STABLE OPERATION NEAR THRESHOLD Iskip_out DUE TO Iskip_in > Iskip_out

DC/DC CONVERTER

TECHNICAL FIELD

The present invention relates to a DC/DC converter.

BACKGROUND ART

As means for generating a stable voltage lower than an input voltage, non-insulated step-down chopper circuits have been widely used. However, such a circuit continues its switching operation even in a light load state such as a standby state, and therefore the lighter the load, the greater the power conversion efficiency decreases.

To solve this problem, a method has been proposed in which an error signal generated by comparing an output voltage and a reference voltage is compared with a predetermined threshold to detect a light load and, once a light load state is reached, the ON and OFF of a switching transistor are controlled according to the pulsation of the error signal to repeat intermittent operations.

In this control method, the lighter the load, the lower the frequency of the switching operation becomes. This enables reduction in the switching loss, and also reduction in the gate drive current of the switching transistor as well. Thus, the efficiency can be improved (U.S. Pat. No. 5,481,178). FIG. 1 illustrates a DC/DC converter described in U.S. Pat. No. 5,481,178.

The DC/DC converter illustrated in FIG. 1 includes an oscillator 1, an SR flip-flop 2, an AND circuit 3, a high-side driver 4, a drive regulator (REG) circuit 5, a backflow preventing diode 6, a bootstrap capacitor 7, a high-side MOSFET 8, an inductor 9, an output capacitor 10, an output load 11, a feedback resistance 12, a feedback resistance 13, an error amplifier 14, a phase compensation resistance 15, a phase compensation capacitor 16, a PWM comparator 17, an inverter 18, a NOR circuit 19, a low-side driver 20, a low-side MOSFET 21, a zero crossing detection circuit 22, a light load detection comparator 23, a constant current source Ibias1, and a constant current source Ibias2.

Next, operations in a steady load state (Iout>Iskip_in) range will first be described with reference to a timing chart illustrated in FIG. 2.

An output voltage Vout is divided by the feedback resistance 12 and the feedback resistance 13 to generate a feedback voltage FB. The feedback voltage FB is inputted to the inverting input terminal of the error amplifier 14, whereas a reference voltage Vref is input to the non-inverting input terminal of the error amplifier 14. The error amplifier 14 generates an amplified error signal COMP from the feedback voltage FB and the reference voltage Vref. The amplified error signal COMP is outputted to the inverting input terminal of the PWM comparator 17 and the inverting input terminal of the light load detection comparator 23. A first light load detection threshold Vsk_Lo is inputted to the non-inverting input terminal of the light load detection comparator 23. When an output load current Iout is sufficiently large, COMP>Vsk_Lo holds, and thus an output signal SKIP of the light load detection comparator 23 is at a low level, and the light load detection comparator 23 outputs a low level signal to the input of the inverter circuit 18. As a result, an intermittent oscillation operation is disabled.

The constant current source Ibias2 is connected to the oscillator 1, and the oscillator 1 generates set pulses based on the constant current source Ibias2 and outputs the set pulses to a set terminal S of a PWM latch 2.

The constant current source Ibias1 is connected to the drive REG circuit 5, and the drive REG circuit 5 supplies a drive voltage to the low-side drive circuit 20 and to the high-side drive circuit 4 through the backflow preventing diode 6.

When the PWM latch 2 shifts to a set state, the high-side driver 4 is driven through the AND circuit 3, so that the high-side MOSFET 8 is turned on. In this step, the voltage of an SW terminal rises to near the voltage of a DC power source Vin, and a current IDH corresponding to the voltage difference between the SW terminal and a Vout terminal flows into the inductor 9. As a result, energy is supplied to the output capacitor 10 and the output load 11.

On the other hand, a high-side current detection signal Vtrip proportional to the drain current IDH of the high-side MOSFET 8 is inputted to the non-inverting input terminal of the PWM comparator 17. The PWM comparator 17 outputs a reset signal RESET to the PWM latch 2 when the high-side current detection signal Vtrip reaches or exceeds the amplified error signal COMP during the ON period of the high-side MOSFET 8. When the PWM latch 2 shifts to a reset state, the high-side driver 4 is turned off through the AND circuit 3, and the low-side driver 20 is turned on through the NOR circuit 19. Thus, the high-side MOSFET 8 is switched from on to off, and the low-side MOSFET 21 is switched from off to on. Accordingly, a regeneration current IDL is supplied to the inductor 9 from the source of the low-side MOSFET 21 through the drain thereof.

In a case of a continuous current operation in which the regeneration of the inductor 9 is not completed within an oscillation cycle determined by the oscillator 1, the PWM latch 2 again shifts to the set state, so that the low-side MOSFET 21 is turned off and the high-side MOSFET 8 is turned on.

By repeating the operations described above, a step-down chopper operation is performed. Next, operations performed when the load state shifts from the steady load state to a light load state and then returns to the steady load state will be described with reference to FIG. 2. As Iout decreases, the amplified error signal COMP decreases. Thus, the peak value of the drain current IDH of the high-side MOSFET 8 is controlled to be small. The light load detection comparator 23 compares the amplified error signal COMP and the first light load detection threshold Vsk_Lo. When the amplified error signal COMP falls below the first threshold Vsk_Lo, the first threshold Vsk_Lo is switched to a second threshold Vsk_Hi, and a light load detection signal SKIP is switched from low to high. As a result, the high-side MOSFET 8 is forcibly turned off through the inverter 18, the AND circuit 3, and the high-side driver 4. Then, when the zero crossing detection circuit 22 detects that the regeneration period of the inductor 9 is completed, and a zero crossing signal ZERO is switched from low to high, the low-side MOSFET 21 is turned off through the NOR circuit 19 and the low-side driver 20.

Thereafter, when the electric charge of the output capacitor 10 is discharged by the output current Tout during the period in which the intermittent oscillation switching operation is stopped, the output voltage Vout slightly decreases and the potential difference between the voltage of an FB terminal and the voltage Vref widens. As a result, the amplified error signal COMP rises.

When the amplified error signal COMP reaches or exceeds the second light load threshold Vsk_Hi, the light load detection comparator 23 switches the light load detection signal SKIP from high to low, so that the light load detection threshold is switched from the second threshold Vsk_Hi to the first threshold Vsk_Lo. In this step, the output of the inverter 18 is switched from low to high, so that the switching operation resumes.

By repeating the series of operations described above, an intermittent oscillation operation is performed, and control is performed such that the smaller the output current Iout, the longer the intermittent oscillation cycle becomes. Thus, the switching loss that occurs at the high-side MOSFET 8 and the low-side MOSFET 21 is reduced. Accordingly, the efficiency in the light load state is improved.

Thereafter, as Iout increases, the length of time required to lower Vout during the intermittent oscillation OFF period shortens according to the increase in Iout, and thereby the intermittent oscillation cycle shortens. Once the amplified error signal COMP rises and never falls below the first light load detection threshold Vsk_Lo, the operation shifts to the steady oscillation operation.

As a proposal to reduce the number of times switching is performed during a light load state, Japanese Patent Application Publication No. 2007-020352 proposes a step-down chopper which detects an output voltage with a hysteresis comparator, turns off a switching element when the detected voltage reaches a first threshold and turns on the switching element when the detected voltage reaches a second threshold smaller than the first threshold, and shifts the second threshold to a higher potential side by a predetermined voltage width during a light load state.

However, in the case of U.S. Pat. No. 5,481,178, there is a first problem as below. Specifically, there is a propagation delay in the PWM comparator 17. Thus, when the current detection signal Vtrip reaches the amplified error signal COMP, the PWM comparator 17 cannot quickly output a reset signal to the PWM latch 2 and turn off the high-side MOSFET 8. For this reason, the amplified error signal COMP is controlled in advance to a voltage lower than a target level. The propagation delay is constant. Thus, as illustrated in FIG. 3A, in a condition where Vout is relatively high (small voltage difference between Vin and Vout), each ON period of the high-side MOSFET 8 (corresponding to each ON period of Vtrip in FIG. 3A) is sufficiently long as compared to a propagation delay $\Delta T$, and therefore the propagation delay $\Delta T$ is not particularly problematic.

However, in a condition where Vout is set to be relatively low (large difference between Vin and Vout), each ON period of the high-side MOSFET 8 (corresponding to each ON period of Vtrip in FIG. 3B) is so short that the influence of the propagation delay cannot be ignored, and the amplified error signal COMP has to be controlled to a voltage significantly smaller than the target level. The light load detection comparator 23 compares this amplified error signal COMP and the first light load detection threshold Vsk_Lo for light load detection. In this connection, as illustrated in FIG. 9, the current level for light load determination (light load detection threshold) is larger for a condition with lower Vout. This leads to a problem in that an intermittent oscillation operation is performed even in a heavy load range where a steady oscillation operation should be performed.

Moreover, there is a second problem as below. Specifically, when the high-side MOSFET 8 is turned on during an intermittent oscillation period, Vout rises, and the voltage difference between the voltage of the FB terminal and the reference voltage Vref increases. Thus, the amplified error signal COMP drops, and the light load detection signal SKIP again is switched from low to high, so that the operations of the high-side MOSFET 8 and the low-side MOSFET 21 are stopped. In the real situation, however, there is a response delay in the amplified error signal COMP, and the amplified error signal COMP cannot quickly drop below the first light load detection threshold (Vsk_Lo). As a consequence, multiple switching operations are performed within one intermittent oscillation cycle as illustrated in FIG. 2. Thus, the ripple voltage superimposed on Vout is increased, and the intermittent oscillation OFF period becomes unnecessarily long. As a result, the intermittent oscillation frequency may become lower than the human hearing range (20 kHz or below). In a case of using a ceramic capacitor as the output capacitor 10, such frequency leads to a problem in that acoustic noises are generated due to its piezoelectric effect.

Moreover, there is a third problem in that there is no current difference between the load current at which the intermittent oscillation operation is started and the load current at which the intermittent oscillation operation is ended, and therefore the operation becomes unstable in a near-threshold load range. According to Japanese Patent Application Publication No. 2007-020352, the second problem may be reduced, but the first and third problems are not yet to be solved.

An object of the present invention is to provide a DC/DC converter capable of disabling an intermittent oscillation operation in a heavy load range without increasing a light load detection threshold even in a condition where an output voltage is low.

SUMMARY OF INVENTION

A DC/DC converter according to a first aspect of the invention is a DC/DC converter configured to convert a first DC voltage into a second DC voltage by turning on and off a switching element in accordance with a drive signal generated by a control circuit, in which the control circuit includes: an oscillator configured to output pulses at a predetermined frequency; an error amplifier configured to amplify an error between the second DC voltage and a reference voltage and output an amplified error signal; an inductor connected to the switching element and an output terminal of the second DC voltage; a zero crossing detection circuit configured to output a zero crossing signal when a regeneration period of the inductor is completed; a light load detection circuit configured to compare the amplified error signal from the error amplifier and a threshold and output a light load signal; a timer circuit configured to output an intermittent operation enabling signal after an elapse of a predetermined period of time based on the light load signal from the light load detection circuit and the zero crossing signal from the zero crossing detection circuit, and output an intermittent operation disabling signal when a period without output of the zero crossing signal continues for a predetermined period of time; and an ON-OFF control controller configured to turn off the switching element when the amplified error signal falls below the threshold while the timer circuit is outputting the intermittent operation enabling signal, and turn on the switching element when the amplified error signal at least reaches or exceeds the threshold while the timer circuit is outputting the intermittent operation enabling signal.

BRIEF DESCRIPTION OF DRAWINGS

FIG. 2 is a timing chart for describing the operations of parts in the conventional DC/DC converter.

DESCRIPTION OF EMBODIMENTS

Figure 1:
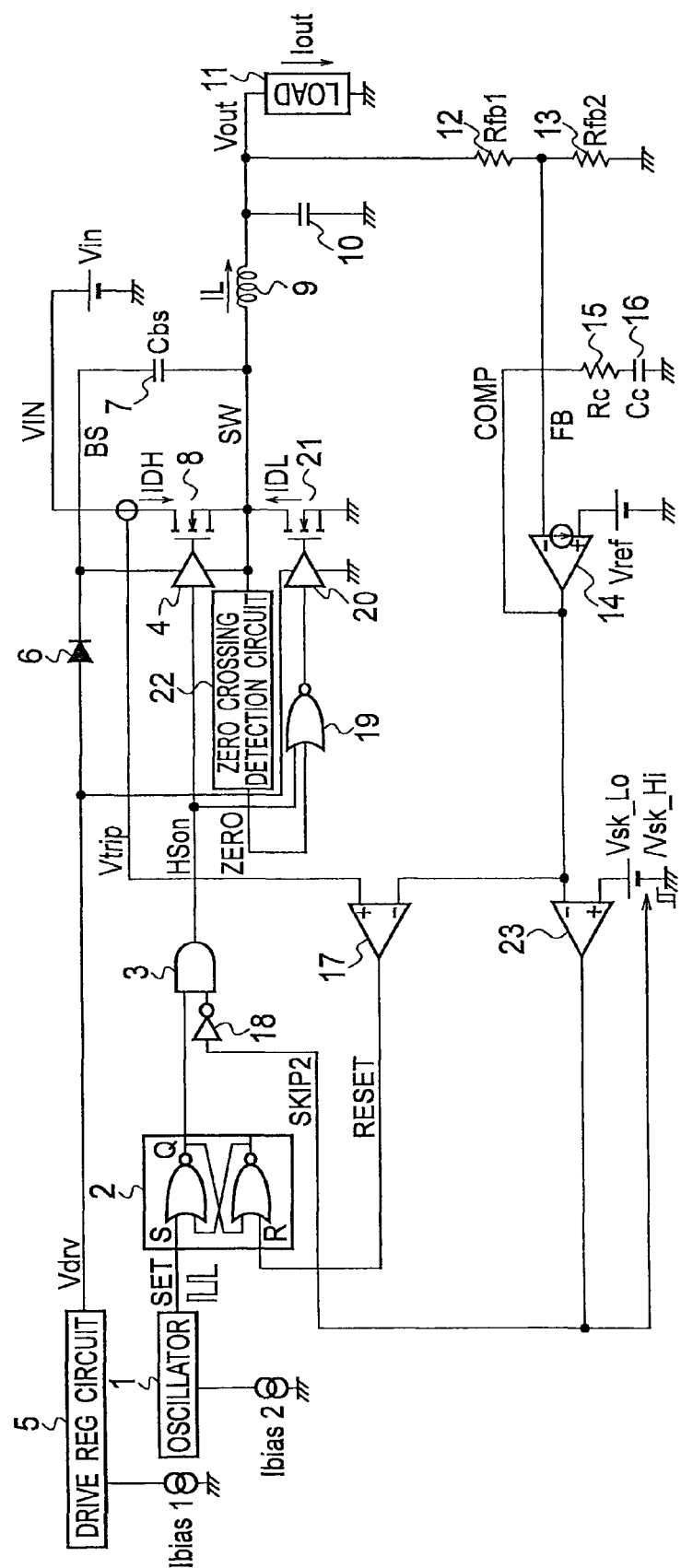
FIG. 1 is a circuit configuration diagram of a conventional DC/DC converter.
Figure 3A:
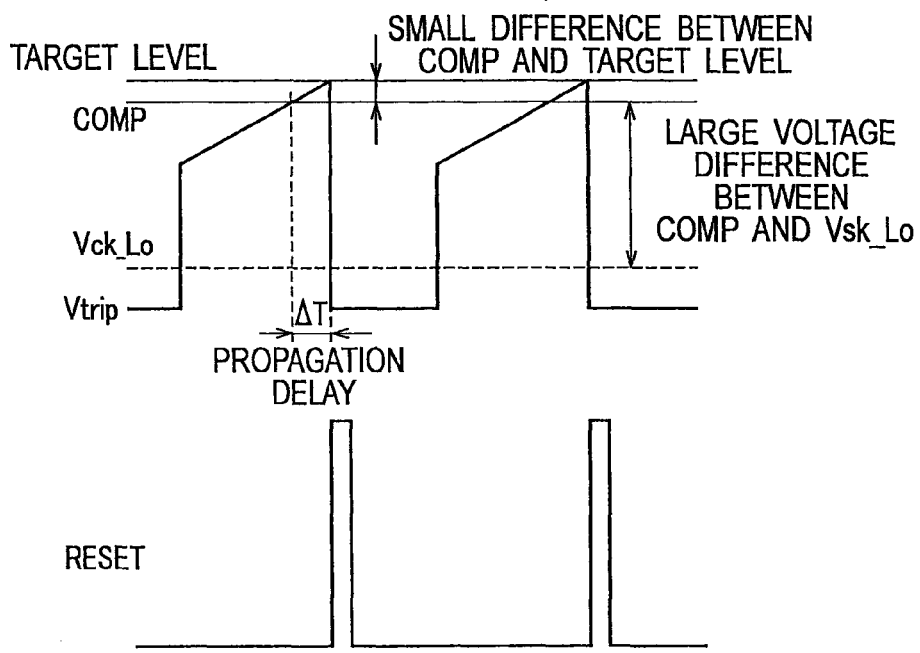
FIGS. 3A and 3B are graphs describing the problem of the conventional DC/DC converter in that a light load detection threshold drastically rises in a case where the voltage difference between an input voltage and an output voltage is large.
Figure 3B:
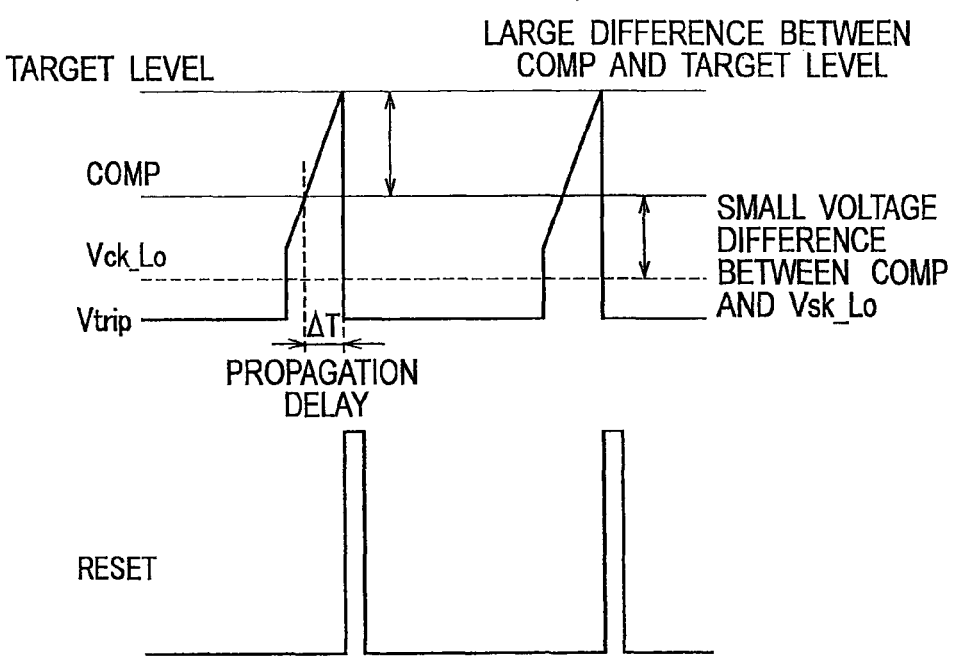

Hereinbelow, some embodiments of a DC/DC converter of the present invention will be described in detail with reference to drawings. First, an overview of the present invention will be described.

In the conventional techniques, a light load state is detected by comparing an amplified error signal and a threshold. However, the present invention is characterized by detecting a light load state through a combination of detection with an amplified error signal and use of a zero crossing detection circuit configured to detect discontinuity in inductor current.

Specifically, the present invention uses a combination of a light load detection comparator configured to detect a light load state by comparing an amplified error signal and a light load detection threshold and a zero crossing detection circuit configured to detect the completion of a regeneration period of an inductor. In a condition where a Vout value is relatively small, the light load detection is performed by using the zero crossing detection. In a condition where the Vout value is relatively large, the light load detection is performed by using the light load detection comparator. In this way, it is possible to solve the problem in that the light load detection threshold drastically increases when Vout is low. Accordingly, light load detection less dependent on Vout can be achieved.

Moreover, in the conventional techniques, the switching operation is stopped when the amplified error signal falls below the light load detection threshold, and the switching operation is resumed when the amplified error signal reaches or exceeds the light load detection threshold. However, the present invention is characterized by adding an intermittent oscillation operation control circuit so that the number of time switching is performed during one intermittent oscillation operation period can be kept one.

Specifically, in the present invention, at the end of each ON period in the intermittent oscillation, the amplified error signal is instantaneously lowered by temporarily superimposing a ripple on a FB voltage, to thereby prevent a high-side MOSFET from continuously performing its switching operation. Accordingly, the number of times switching is performed per intermittent cycle is kept one. In this way, the ripple on the output voltage Vout can be kept low, and the intermittent oscillation cycle does not become unnecessarily long. Accordingly, it is possible to suppress acoustic noises from an output capacitor.

Furthermore, in the conventional techniques, a hysteresis is provided by using a first threshold for detecting a light load state and a second threshold larger than the first threshold. However, the present invention is characterized by providing a hysteresis by using a first threshold, a second threshold larger than the first threshold, and a third threshold larger than the second threshold.

Specifically, the present invention involves a configuration in which the light load detection threshold is switched among three levels, namely, the first threshold, the second threshold, and the third threshold. A hysteresis is generated by selecting the first threshold as the light load detection threshold for the light load detection comparator in a case of a shift from a steady oscillation operation to an intermittent oscillation operation. A hysteresis is generated by selecting the second threshold or the third threshold larger in voltage level than the first threshold as the light load detection threshold for the light load detection comparator in a case of a shift from an intermittent oscillation operation to a steady oscillation operation. In this way, it is possible to solve unstable operations near a light load detection threshold.

Next, description will be provided by exemplarily illustrating specific embodiments of the DC/DC converter having the above-described characteristic features.

(Embodiment 1)

Figure 4:
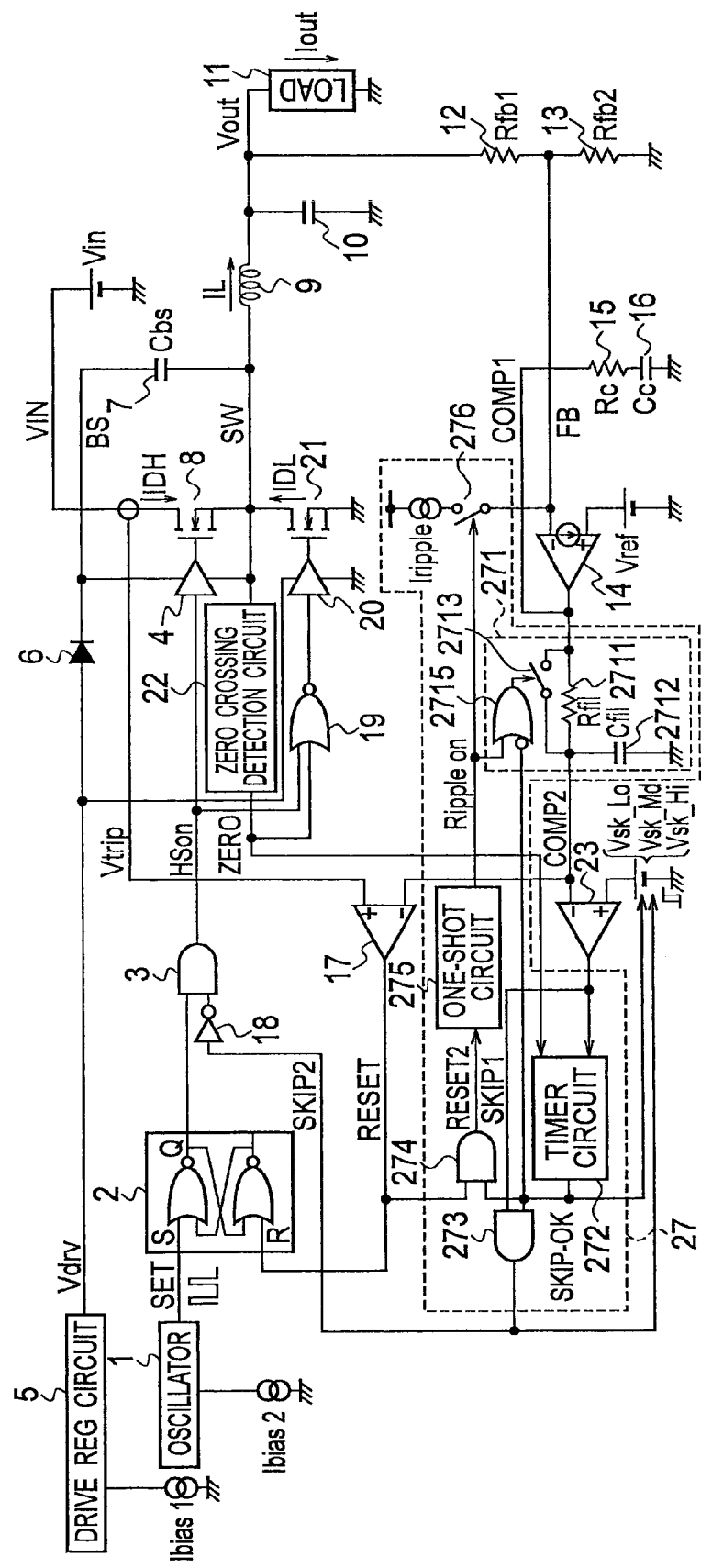
FIG. 4 is a circuit configuration diagram of a DC/DC converter of Embodiment 1 of the present invention.
Figure 5:
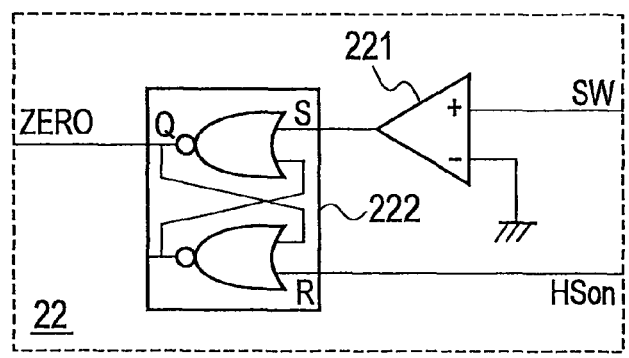
FIG. 5 is a specific circuit configuration diagram of a zero crossing detection circuit in the DC/DC converter of Embodiment 1 of the present invention.
Figure 6:
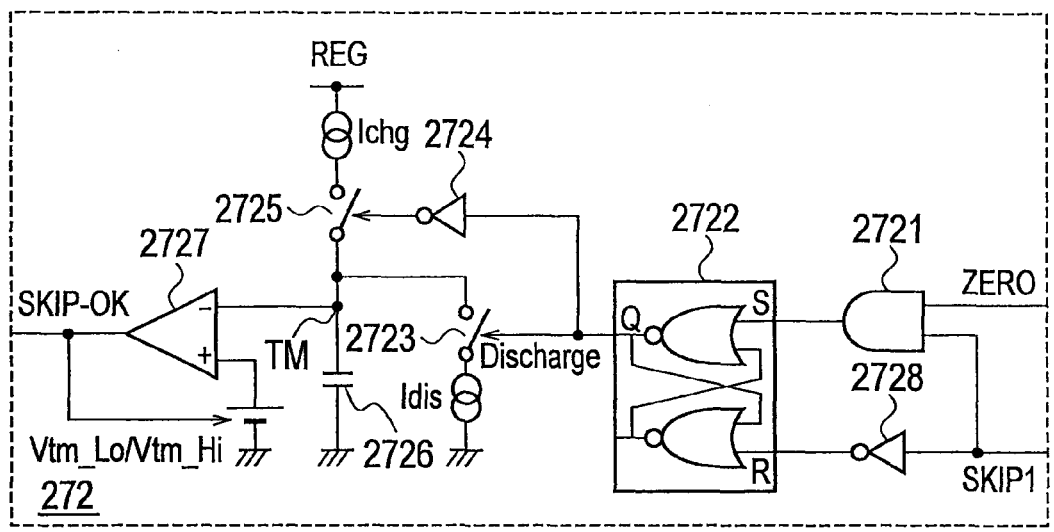
FIG. 6 is a specific circuit configuration diagram of a timer circuit in the DC/DC converter of Embodiment 1 of the present invention.

FIG. 4 is a circuit configuration diagram of a DC/DC converter of Embodiment 1 of the present invention. FIG. 5 is a specific circuit configuration diagram of a zero crossing detection circuit in the DC/DC converter of Embodiment 1 of the present invention. FIG. 6 is a specific circuit configuration diagram of a timer circuit in the DC/DC converter of Embodiment 1 of the present invention.

The DC/DC converter of Embodiment 1 is a DC/DC converter configured to convert a first DC voltage into a second DC voltage by turning on and off switching elements in accordance with drive signals generated by a control circuit.

An oscillator 1 is configured to output pulses at a predetermined frequency. An error amplifier 14 is configured to amplify the error between the second DC voltage and a reference voltage and output an amplified error signal. An inductor 9 is connected to MOSFETs 8, 21 formed of switching elements and the output terminal of a second DC voltage Vout. A zero crossing detection circuit 22 is configured to output a zero crossing signal when a regeneration period of the inductor 9 is completed. A light load detection comparator 23 is configured to compare the amplified error signal from the error amplifier 14 and a threshold and output a light load signal.

The DC/DC converter of Embodiment 1 is characterized in that an intermittent oscillation operation control circuit 27 for controlling intermittent oscillation operation is provided additionally to the configuration of the conventional DC/DC converter illustrated in FIG. 1.

The intermittent oscillation operation control circuit 27 includes, as its constituent components, a low-pass filter circuit 271 including a filter resistance 2711, a filter capacitance 2712, a switch 2713, and an OR circuit 2715, a timer circuit 272, an AND circuit 273, an AND circuit 274, a one-shot circuit 275, a switch 276, and a current source Iripple.

The timer circuit 272 is configured to output an intermittent operation permission signal after the elapse of a predetermined period of time based on the light load signal from the light load detection comparator 23 and the zero crossing signal from the zero crossing detection circuit 22, and output an intermittent operation disabling signal in a case where a period without output of the zero crossing signal continues for a predetermined period of time.

The AND circuit 273, an inverter 18, and an AND circuit 3 (ON-OFF control unit) are configured to turn off the MOSFET 8 when the amplified error signal falls below the threshold while the timer circuit 272 is outputting an intermittent operation enabling signal, and turn on the MOSFET 8 when the amplified error signal at least reaches or exceeds the threshold while the timer circuit 272 is outputting an intermittent operation enabling signal.

The low-pass filter circuit 271 includes an adjustment element configured to adjust its time constant, and is configured to generate a second amplified error signal COMP2 based on a first amplified error signal COMP1 by use of the adjustment element. The filter resistance 2711, the filter capacitance 2712, the switch 2713, and the OR circuit 2715 form the adjustment element.

A PWM comparator 17 (current comparator) is configured to compare the second amplified error signal COMP2 and the current signal flowing in the MOSFET 8, and output a reset signal for turning off the MOSFET 8 to the AND circuit 274 based on the output of the comparison. The AND circuit 274 is configured to AND the reset signal from the PWM comparator 17 and the signal from the timer circuit 272 and output the result to the one-shot circuit 275. The one-shot circuit 275 is configured to generate a one-shot pulse in response to the output from the AND circuit 274 and output it to the switch 2713 through the switch 276 and the OR circuit 2715.

The current source Iripple (voltage superimposition circuit) is connected to the inverting input terminal of the error amplifier 14 through the switch 276. The current source Iripple is configured to superimpose a voltage signal onto the inverting input terminal of the error amplifier 14 for a predetermined period of time (one-shot pulse period) when the PWM comparator 17 outputs a reset signal while the timer circuit 272 is outputting an intermittent operation enabling signal.

The low-pass filter circuit 271 is configured to turn off the switch 2713 upon output of an intermittent operation enabling signal SKIP-OK from the timer circuit 272, to thereby increase the time constant above a predetermined time constant. Further, the low-pass filter circuit 271 is configured to turn on the switch 2713 for the length of the one-shot pulse the one-shot circuit 275 outputs, upon output of a reset signal from the PWM comparator 17 while the timer circuit 272 is outputting an intermittent operation enabling signal.

The current source Iripple is configured to disable the superimposition of the voltage signal after the elapse of the predetermined period of time. The low-pass filter circuit 271 is configured to turn off the switch 2713 after the elapse of the predetermined period of time to increase the time constant above the predetermined time constant.

Figure 7:
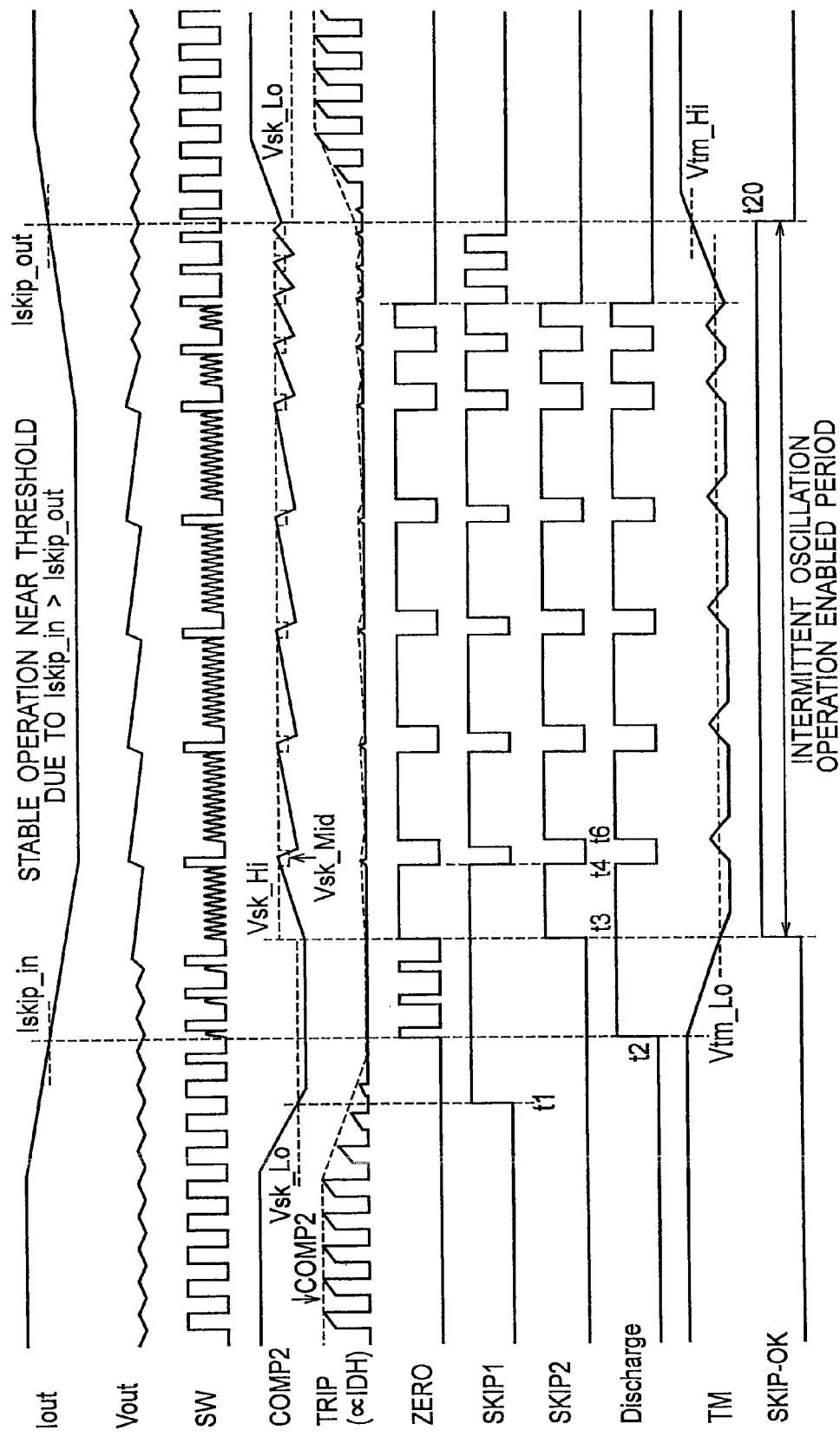
FIG. 7 is a timing chart for describing the operations of parts in the DC/DC converter of Embodiment 1 of the present invention.

Next, operations in a steady load state (Iout>Iskip_in) range will be described with reference to a timing chart illustrated in FIG. 7.

The output voltage Vout is divided by a feedback resistance 12 and a feedback resistance 13, so that a feedback voltage FB is generated. The feedback voltage FB is inputted to the inverting input terminal of the error amplifier 14 whereas a reference voltage Vref is inputted to the non-inverting input terminal of the error amplifier 14. The error amplifier 14 generates the first amplified error signal COMP1 from the feedback voltage FB and the reference voltage Vref and outputs it to the low-pass filter circuit 271.

In a steady load state, the output of the timer circuit 272 is at a low level, and therefore the switch 2713 is closed through the OR circuit 2715 and the attenuation characteristics of the low-pass filter circuit 271 are weakened. Thus, the second amplified error signal COMP2 is a voltage substantially equal to the first amplified error signal COMP1 and inputted to the inverting input terminal of the PWM comparator 17 and the inverting input terminal of the light load detection comparator 23. A light load detection threshold Vsk_Lo is inputted to the non-inverting input terminal of the light load detection comparator 23. When an output current Iout is sufficiently large, COMP2>Vsk_Lo holds, and therefore an output signal SKIP1 of the light load detection comparator 23 is switched to a low level. Accordingly, a signal SKIP2 at a low level is outputted to the input of the inverter circuit 18 through the AND circuit 273. As a result, an intermittent oscillation operation is disabled.

A constant current source Ibias2 is connected to the oscillator 1, and the oscillator 1 generates set pulses based on the current of the constant current source Ibias2 and outputs the set pulses to the set terminal of a PWM latch 2.

A constant current source Ibias1 is connected to a drive REG circuit 5, and the drive REG circuit 5 supplies a drive voltage to a low-side drive circuit 20 and to a high-side drive circuit 4 through a backflow preventing diode 6.

When the PWM latch 2 shifts to a set state, the high-side driver 4 is driven through the AND circuit 3, so that the high-side MOSFET 8 is turned on. In this step, the voltage of an SW terminal rises to near the voltage of Vin, and a current IDH corresponding to the voltage difference between the SW terminal and a Vout terminal flows into the inductor 9. As a result, energy is supplied to an output capacitor 10 and an output load 11.

On the other hand, a high-side current detection signal Vtrip proportional to the drain current IDH of the high-side MOSFET 8 is inputted to the non-inverting input terminal of the PWM comparator 17. The PWM comparator 17 outputs a reset signal RESET to the PWM latch 2 when the high-side current detection signal Vtrip reaches or exceeds the second amplified error signal COMP2 during the ON period of the high-side MOSFET 8. When the PWM latch 2 shifts to a reset state, the high-side driver 4 is turned off through the AND circuit 3, and the low-side driver 20 is turned on through a NOR circuit 19. Thus, the high-side MOSFET 8 is switched from on to off, and the low-side MOSFET 21 is switched from off to on. Accordingly, a regeneration current IDL is supplied to the inductor 9 from the source of the low-side MOSFET 21 through the drain thereof.

In a case of a continuous current operation in which the regeneration of the inductor 9 is not completed within an oscillation cycle determined by the oscillator 1, the PWM latch 2 again shifts to the set state, so that the low-side MOSFET 21 is turned off and the high-side MOSFET 8 is turned on.

By repeating the series of operations described above, a step-down chopper operation is performed.

Figure 8:
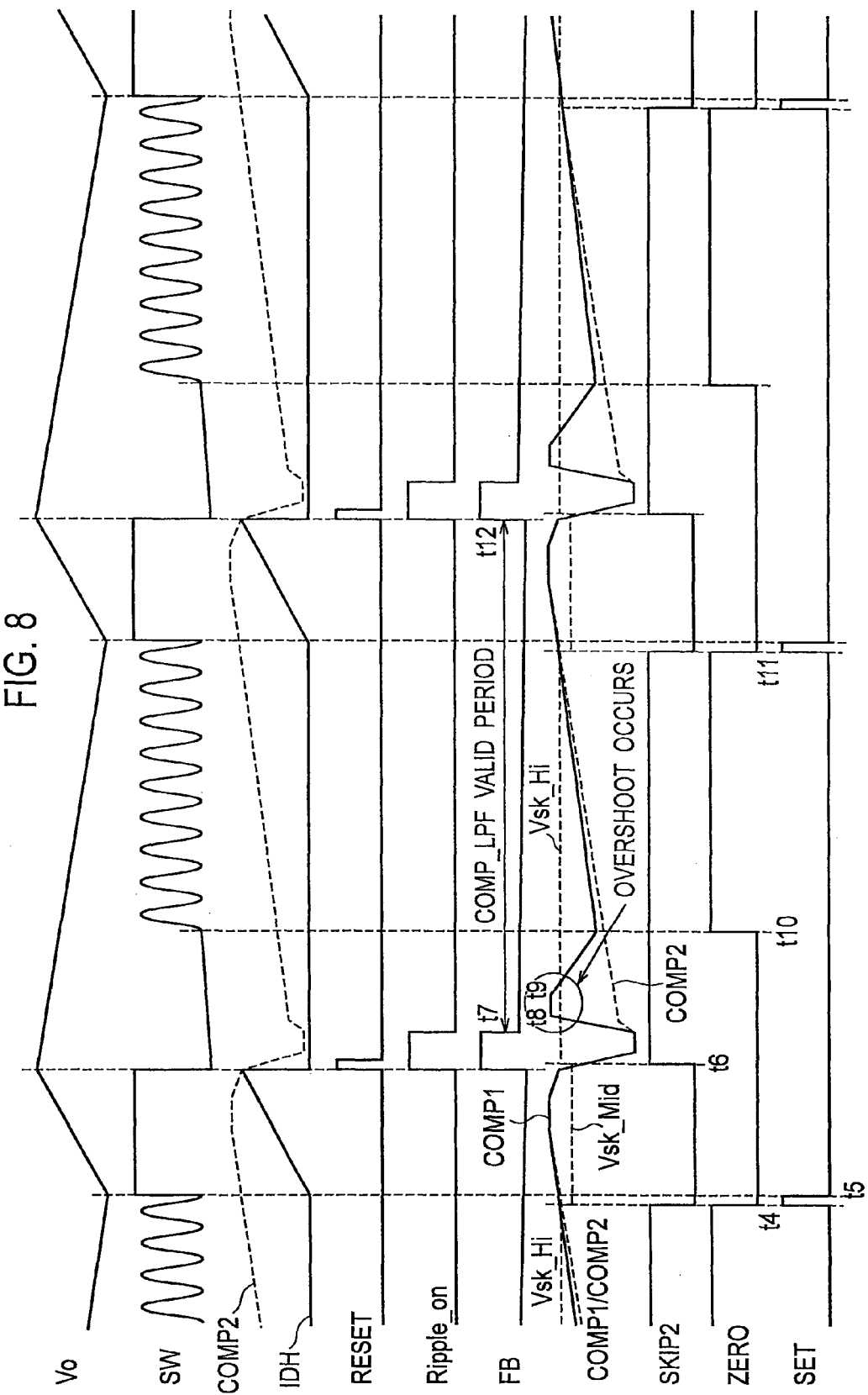
FIG. 8 is a timing chart of parts for describing an operation for superimposing a ripple voltage during an intermittent oscillation operation of the DC/DC converter of Embodiment 1 of the present invention.

Next, operations at the time of a shift from the steady load state to a light load state (Iout=Iskip_in) will be described with reference to FIGS. 7 and 8.

As Iout decreases, the first amplified error signal COMP1 and the second amplified error signal COMP2 decrease. Thus, the peak value of the drain current IDH of the high-side MOSFET is controlled to be small. The light load detection comparator 23 compares the second amplified error signal COMP2 and the first light load detection threshold Vsk_Lo. When the second amplified error signal COMP2 falls below the first light load detection threshold Vsk_Lo at a time t1, the first light load detection signal SKIP1 is switched from low to high, so that the light load detection comparator 23 supplies a signal indicating a light load state to the AND circuit 273 and the timer circuit 272.

Then, as Iout further decreases and the valley current of an inductor current IL reaches zero ampere, a discontinuous current operation occurs. In this step, the polarity of the voltage of the SW terminal is switched from negative to positive. As illustrated in FIG. 5, the zero crossing detection circuit 22 detects the change in the polarity of the voltage of the SW terminal with a comparator 221 and brings an SR flip-flop into a set state. As a result, the low-side MOSFET 21 is turned off through the NOR circuit 19 and the low-side driver 20 and, at the same time, a signal indicating the zero crossing detected state is outputted to the timer circuit 272.

The timer circuit 272 shifts to a state as illustrated in FIG. 6 when both the first light load detection signal SKIP1 and a zero crossing signal ZERO are switched to high at a time t2. An SR flip-flop 2722 shifts to a set state through an AND circuit 2721, thereby turning on a switch 2723 and also turning off a switch 2725 through an inverter 2724. As a result, a capacitor 2726 is discharged with a constant current source Idis.

The comparator 2727 compares a potential TM of the capacitor 2726 and a first intermittent oscillation enabling threshold Vtm_Lo. The potential TM of the capacitor 2726 reaches the first threshold Vtm_Lo at a time t3. Then, the intermittent oscillation enabling signal SKIP-OK is switched from low to high and, at the same time, the first threshold Vtm_Lo is switched to a second threshold Vtm_Hi which is greater in voltage level than the first threshold Vtm_Lo. As a result, the mode is switched to one that enables an intermittent oscillation operation. In this step, the light load detection threshold of the light load detection comparator 23 is switched to a third threshold Vsk_Hi which is greater in voltage level than the first threshold Vsk_Lo.

Moreover, as the signal SKIP-OK is switched from low to high, one of the inputs of the OR circuit 2715 is switched to a low level, so that the switch 2713 opens, and whereas the switch 2713 opens and closes with the other input, or a signal Ripple_on.

Figure 10:
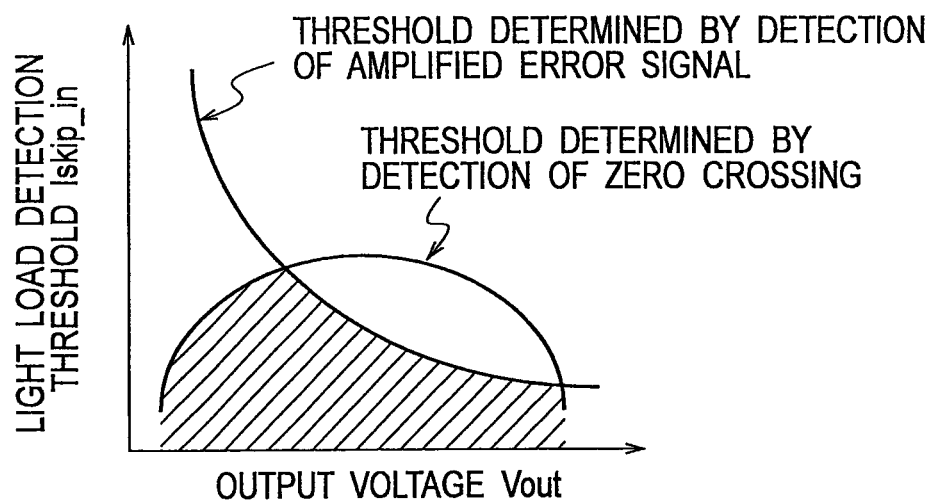
FIG. 10 is a graph illustrating light load detection thresholds with respect to the output voltage in the case of the DC/DC converter of Embodiment 1 of the present invention, obtained by ANDing a threshold determined by amplified error signal detection and a threshold determined by zero crossing detection.

As described above, light load detection is done by causing the AND circuit 2721 to AND SKIP1 from the light load detection comparator 23 and the zero crossing signal ZERO from the zero crossing detection circuit 22. In a condition where the Vout value is relatively small, the light load threshold level determined by the zero crossing detection circuit 22 is lower than the light load threshold level determined by the light load detection comparator 23. Thus, the zero crossing detection circuit 22 preferentially determines a light load detection threshold Iskip_in. In this case, the light load detection threshold Iskip_in is expressed as $$Iskip\_in = Vout(Vin - Vout)/(2 \cdot L \cdot Vin \cdot Fsw)$$

where L is the inductance of the inductor 9 and Fsw is the steady oscillation frequency. In the condition where Vout is relatively low, a parabolic characteristic is obtained in a graph with Iskip_in on the vertical axis and Vout on the horizontal axis, as illustrated in FIG. 10.

Figure 9:
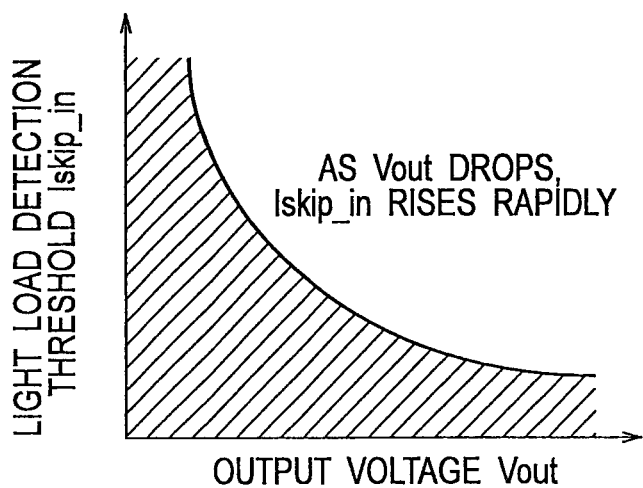
FIG. 9 is a graph illustrating light load detection thresholds with respect to the output voltage in the case of the conventional DC/DC converter, determined solely by amplified error signal detection.

On the other hand, in a range where Vout is relatively high, the conventional light load detection comparator 23 preferentially determines the Iskip_in level. FIG. 10 illustrates such a situation. Accordingly, it is possible to solve the conventional problem in that Iskip_in is large in a range illustrated in FIG. 9 where Vout is low. Moreover, it is possible to prevent Iskip_in from becoming excessively large in a range where Vout is high, and therefore achieve a light load detection operation which is less dependent on Vout.

Next, operations during an intermittent oscillation period in the light load state (Iout<Iskip_in) will be described with reference to FIGS. 7 and 8.

In a state where the signal SKIP-OK is high and intermittent oscillation is enabled, the AND circuit 273 outputs a high second light load detection signal SKIP2 when the first light load detection signal SKIP1 is high, to thereby forcibly turn off the high-side MOSFET 8 through the inverter 18, the AND circuit 3, and the high-side driver 4. Thereafter, at the time t3, the zero crossing detection circuit 22 detects that the regeneration period of the inductor 9 is completed, and the zero crossing signal ZERO is switched from low to high. As a result, the low-side MOSFET 21 is turned off through the NOR circuit 19 and the low-side driver 20.

Thereafter, when the electric charge of the output capacitor 10 is discharged by the output current Iout during the period in which the intermittent oscillation switching operation is stopped, Vout slightly decreases and the potential difference between an FB terminal and Vref widens. As a result, the first amplified error signal COMP1 rises, and the second amplified error signal COMP2 rises as well.

When the second amplified error signal COMP2 reaches or exceeds the third light load threshold Vsk_Hi at a time t4, the light load detection comparator 23 switches the first light load detection signal SKIP1 from high to low, thereby switching the second light load detection signal SKIP2 from high to low as well. Thus, the light load detection threshold is switched to a second light load threshold Vsk_Md which is smaller in voltage level than Vsk_Hi but larger than Vsk_Lo. In this step, the output of the inverter 18 is switched from low to high, so that the switching operation of the MOSFET 8 resumes.

Thereafter, as the drain current IDH of the high-side MOSFET 8 increases, and the current detection signal Vtrip reaches the second amplified error signal COMP2 at a time t6, the PWM comparator 17 outputs a reset signal to the PWM latch 2 to turn on the high-side MOSFET 8. In this step, a reset signal RESET2 is also supplied to the one-shot circuit 275 through the AND circuit 274.

Upon receipt of the reset signal RESET2, the one-shot circuit 275 switches the signal Ripple_on from low to high for a predetermined period of time (times t6 to t7). As a result, the switch 276 is turned on, so that the constant current Iripple is supplied to the FB terminal, and the voltage of the FB terminal rises instantaneously. Further, at this timing, the signal Ripple_on turns on the switch 2713 through the OR circuit 2715, so that the time constant of the low-pass filter circuit 271 is reduced and the attenuation effect is weakened.

As the voltage of the FB terminal rises rapidly, the voltage difference between the voltage of the FB terminal and Vref widens. Thus, the error amplifier 14 instantaneously lowers the first amplified error signal COMP1, and the second amplified error signal COMP2 lowers accordingly (times t6 to t7).

As the second amplified error signal COMP2 lowers and reaches the light load detection threshold Vsk_Md, the light load detection comparator 23 again switches the first light load detection signal SKIP1 from low to high to stop the switching operation of the high-side MOSFET 8 and, at the same time, switches the light load detection threshold to Vsk_Hi.

After the elapse of the predetermined period of time (times t6 to t7), the one-shot circuit 275 switches the signal Ripple_on from high to low to turn off the switch 276. Here, between times t8 to t9, overshoot of the first amplified error signal COMP1 may possibly occur, thus leading to erroneous detection by the light load detection comparator 23. For this reason, the switch 2713 is turned off to increase the time constant of the low-pass filter circuit 271 and enhance the attenuation characteristics thereof. In this way, it is possible to prevent the occurrence of overshoot of the second amplified error signal COMP2.

Then, after the regeneration period of the inductor 9 ends, the switching operation of the low-side MOSFET 21 is stopped.

By repeating the series of operations described above, an intermittent oscillation operation is performed, and control is performed such that the smaller the output current Iout, the longer the intermittent oscillation cycle becomes. In this way, the switching loss that occurs at the high-side MOSFET 8 and the low-side MOSFET 21 is reduced, and the efficiency in the light load state is improved. Further, by temporarily superimposing a ripple onto the FB voltage at the end of the ON period of the intermittent oscillation, the second amplified error signal is instantaneously lowered, thereby preventing the high-side MOSFET 8 from continuously performing its switching operation. Accordingly, the number of times switching is performed per intermittent cycle is kept one. In this way, the ripple on the output voltage Vout can be kept low, and the intermittent oscillation cycle does not become unnecessarily long. Accordingly, it is possible to suppress acoustic noises from the output capacitor 10.

Lastly, operations at the time of a return from the light load state to the steady load state (Iout≥Iskip_out) will be described with reference to FIG. 7. As Iout increases, the length of time required to lower Vout during the intermittent oscillation OFF period shortens, and therefore the intermittent oscillation cycle shortens. Then, as the mode shifts to a continuous mode in which the valley current value of the inductor current IL is equal to or greater than 0 A, the zero crossing signal ZERO is fixed at low, so that the SR flip-flop 2722 shifts to a reset state. Thus, the switch 2725 is turned on and the switch 2723 is turned off, and the capacitor 2726 starts to be charged. When the potential TM of the capacitor 2726 reaches the second intermittent oscillation enabling threshold Vtm_Hi, the comparator 2727 is inverted to switch the signal SKIP-OK from high to low and, at the same time, the light load detection threshold is switched to the first threshold Vsk_Lo.

As described above, the configuration is such that the light load detection threshold is switched among three levels, namely, the first threshold Vsk_Lo, the second threshold Vsk_Md, and the third threshold Vsk_Hi. The first threshold Vsk_Lo is selected as the light load detection threshold of the light load detection comparator 23 in a case of a shift from a steady oscillation operation to an intermittent oscillation operation. The second threshold Vsk_Md or the third threshold Vsk_Hi larger in voltage level than the first threshold Vsk_Lo is selected as the light load detection threshold of the light load detection comparator 23 in a case of a shift from an intermittent oscillation operation to a steady oscillation operation. In this way, a hysteresis is generated. Accordingly, it is possible to solve unstable operations near a light load detection threshold.

As described above, according to the DC/DC converter of Embodiment 1, the timer circuit 272 outputs an intermittent operation enabling signal after the elapse of a predetermined period of time based on the light load signal from the light load detection circuit 23 and the zero crossing signal from the zero crossing detection circuit 22, and outputs an intermittent operation disabling signal in a case where a period without output of the zero crossing signal continues for a predetermined period of time. Specifically, the light load detection circuit preferentially outputs an intermittent operation enabling signal when the output voltage is high, whereas the zero crossing detection circuit preferentially outputs an intermittent operation enabling signal when the output voltage is low. For this reason, it is possible to disable an intermittent oscillation operation in a heavy load range without increasing the light load detection threshold even in a condition where the output voltage is low.

Moreover, the current source Iripple superimposes a ripple onto the inverting input terminal of the error amplifier 14 for a predetermined period of time, when the PWM comparator 17 outputs a reset signal while the timer circuit 272 is outputting an intermittent operation enabling signal. Thus, the amplified error signal is instantaneously lowered, and the high-side MOSFET 8 is prevented from continuously performing its switching operation. Accordingly, the number of times switching is performed per intermittent cycle is kept one.

In this way, the ripple on the output voltage Vout can be kept low, and the intermittent oscillation cycle does not become unnecessarily long. Accordingly, it is possible to suppress acoustic noises from the output capacitor.

Moreover, the timer circuit 272 selects the first threshold at the time of a shift from a steady oscillation operation to an intermittent oscillation operation, and selects the second threshold or the third threshold at the time of a shift from the intermittent oscillation operation to the steady oscillation operation. In this way, a current difference is purposely made between the load current at which the intermittent oscillation operation is started and the load current at which the intermittent oscillation operation is ended. Accordingly, it is possible to solve unstable operations near a light load detection threshold.

(Embodiment 2)

Figure 11:
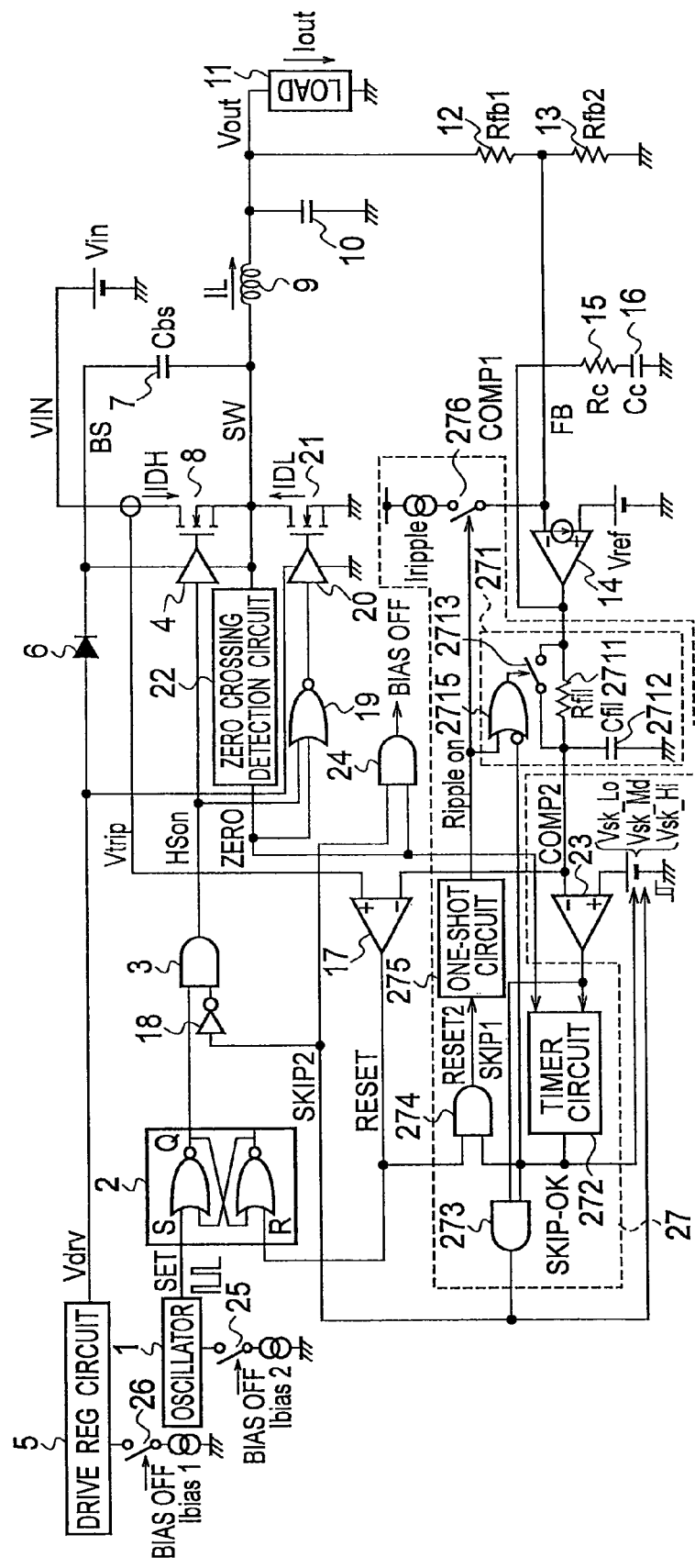
FIG. 11 is a circuit configuration diagram of a DC/DC converter of Embodiment 2 of the present invention.
Figure 12:
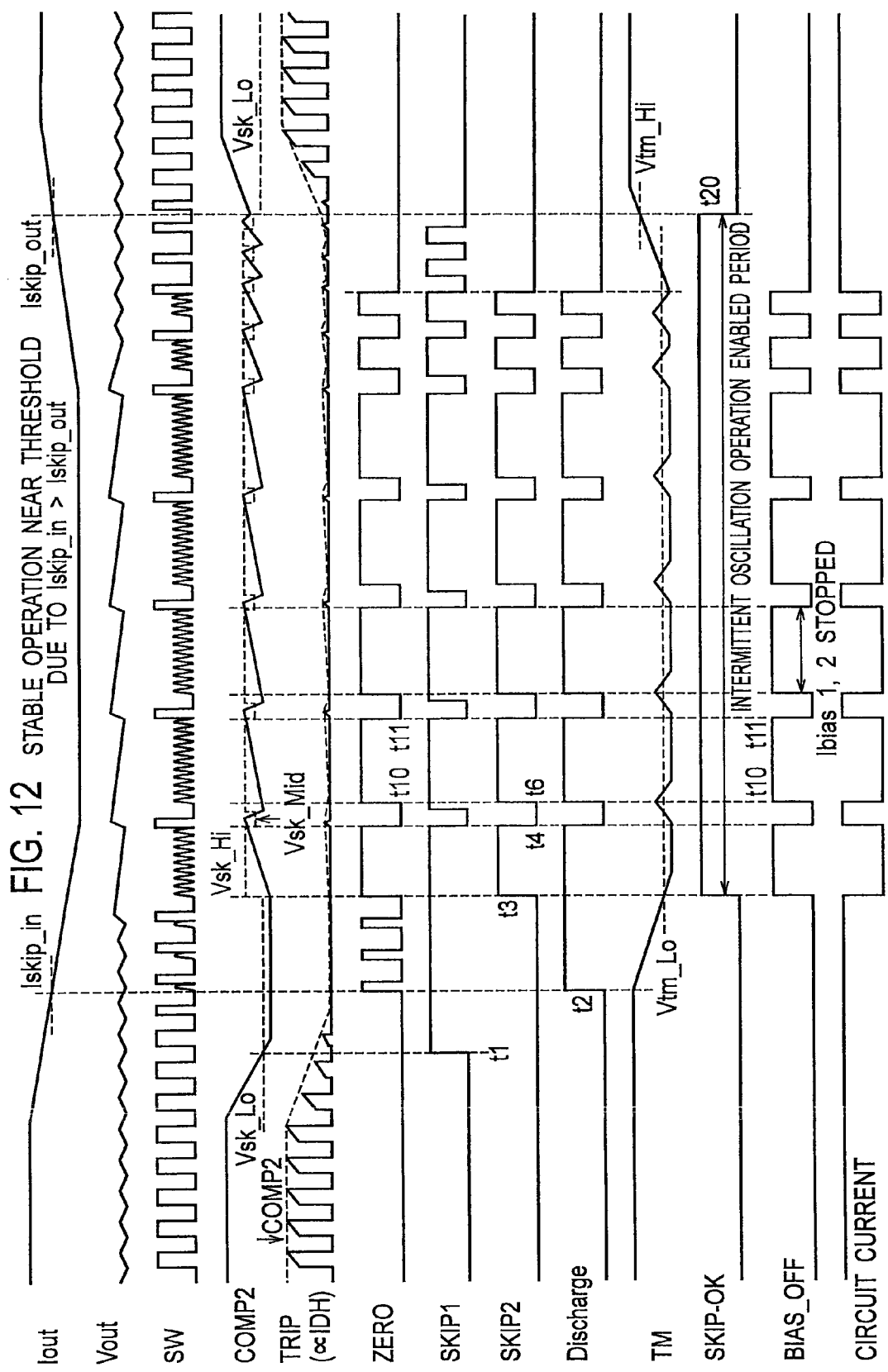
FIG. 12 is a timing chart for describing the operations of parts in the DC/DC converter of Embodiment 2 of the present invention.

FIG. 11 is a circuit configuration diagram of a DC/DC converter of Embodiment 2 of the present invention. FIG. 12 is a timing chart for describing the operations of parts in the DC/DC converter of Embodiment 2 of the present invention.

The DC/DC converter of Embodiment 2 illustrated in FIG. 11 is characterized in that an AND circuit 24, a switch 25, and a switch 26 are provided additionally to the DC/DC converter of Embodiment 1 illustrated in FIG. 4. Note that description of the same constituent components as those illustrated in FIG. 4 is omitted.

The switch 25 is connected to one end of a drive REG circuit 5 and one end of a bias source Ibias1. The switch 26 is connected to one end of an oscillator 1 and one end of a bias source Ibias2. The AND circuit 24 is configured to AND a zero crossing signal from a zero crossing detection circuit 22 and SKIP2 from an AND circuit 273 and output a signal BIAS_OFF to the switch 25 and the switch 26.

Next, operations will be described with reference to the timing chart illustrated in FIG. 12. First, the signal BIAS_OFF is switched from low to high during a period in which the intermittent oscillation operation is off and a period in which the regeneration of an inductor 9 is completed and the zero crossing signal is high (e.g. times t3 to t4), to thereby turn off the switch 25 and the switch 26 and stop the oscillator 1 and the drive REG circuit 5.

The AND circuit 24 switches the signal BIAS_OFF from high to low during a period in which the intermittent oscillation operation is on, to thereby turn on the switch 25 and the switch 26 and resume the operations of the oscillator 1 and the drive REG circuit 5. As a result, the switching operations of a high-side MOSFET 8 and a low-side MOSFET 21 are resumed.

By repeating the above, the average of the current consumed in the DC/DC converter can be reduced. Accordingly, the DC/DC converter of Embodiment 2 can further improve the efficiency in the light load state than the DC/DC converter of Embodiment 1 illustrated in FIG. 4.

(Embodiment 3)

Figure 13:
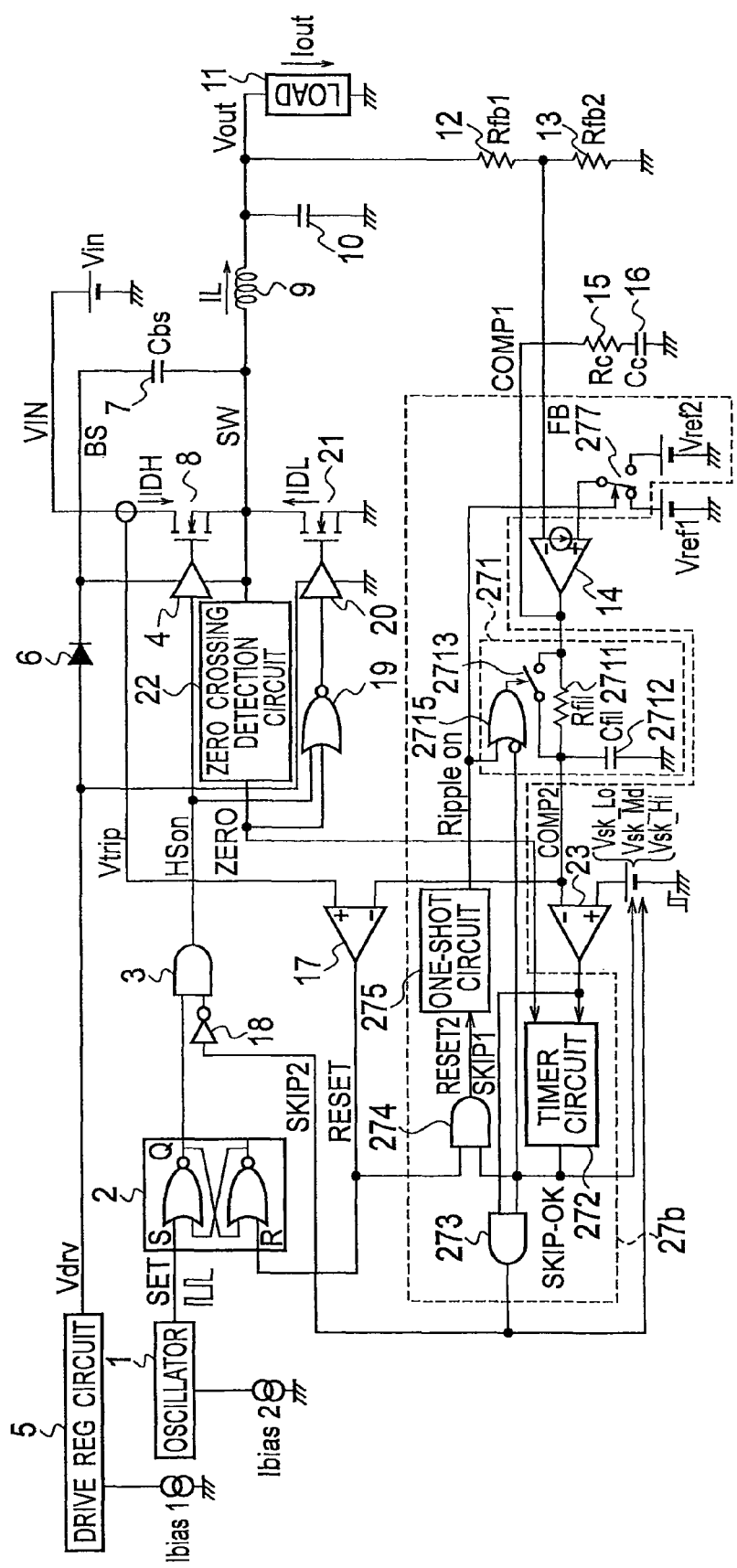
FIG. 13 is a circuit configuration diagram of a DC/DC converter of Embodiment 3 of the present invention.
Figure 14:
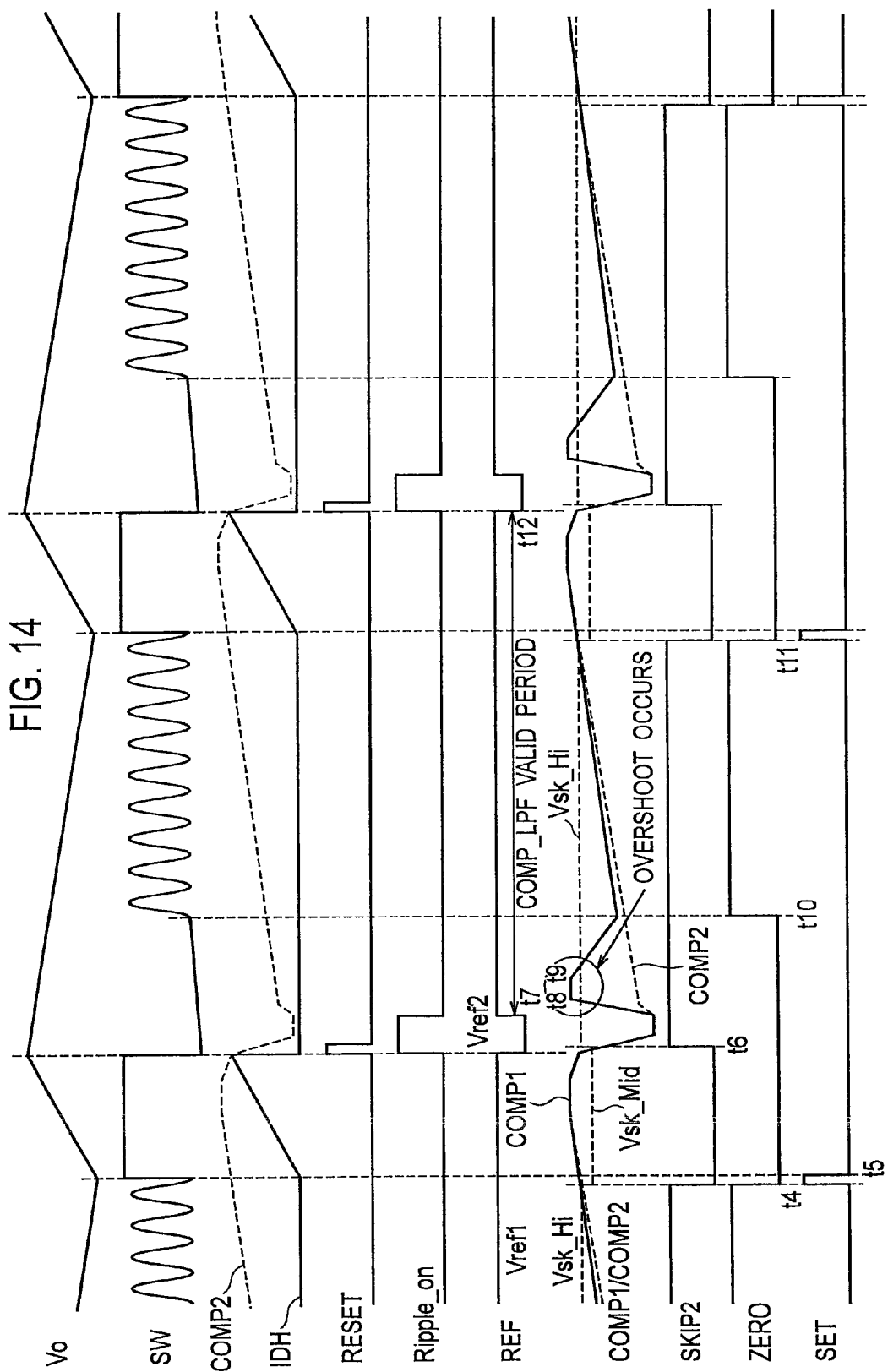
FIG. 14 is a timing chart for describing the operations of parts in the DC/DC converter of Embodiment 3 of the present invention.

FIG. 13 is a circuit configuration diagram of a DC/DC converter of Embodiment 3 of the present invention. FIG. 14 is a timing chart for describing the operations of parts in the DC/DC converter of Embodiment 3 of the present invention.

The DC/DC converter of Embodiment 3 is characterized in that the intermittent oscillation operation control circuit 27 of the DC/DC converter of Embodiment 1 illustrated in FIG. 4 is changed to an intermittent oscillation operation control circuit 27b.

The intermittent oscillation operation control circuit 27b is obtained by removing the current source Iripple and the switch 276 from the intermittent oscillation operation control circuit 27 and adding a reference voltage Vref2 and a switch 277 thereto.

The common terminal of the switch 277 is connected to the non-inverting input terminal of an error amplifier 14, a reference voltage Vref1 is connected to the first switching terminal of the switch 277, and a reference voltage Vref2 lower than the reference voltage Vref1 is connected to the second switching terminal of the switch 277. The switch 277 is configured to turn on and off in response to a signal Ripple_on from a one-shot circuit 275.

In Embodiment 1 illustrated in FIG. 4, the amplified error signal is instantaneously lowered by temporarily superimposing a ripple onto the FB voltage at the end of the ON period of intermittent oscillation so that the number of times switching is performed during one intermittent oscillation operation period can be kept one. In this way, the high-side MOSFET is prevented from continuously performing its switching operation.

On the other hand, in Embodiment 3, the input voltage to the non-inverting input terminal of the error amplifier 14 is switched to the reference voltage Vref2 lower than the reference voltage Vref1 by use of the switch 277 in accordance with the signal Ripple_on the one-shot circuit 275 outputs. In this way, the amplified error signal is instantaneously lowered, thereby preventing the high-side MOSFET from continuously performing its switching operation.

Accordingly, as in Embodiment 1 illustrated in FIG. 4, the number of times switching is performed per one intermittent cycle is kept one, and the ripple on an output voltage Vout, which has been a problem of the conventional technique, can be kept low. Moreover, the intermittent oscillation cycle does not become unnecessarily long, and it is therefore possible to suppress acoustic noises from the output capacitor.

(Embodiment 4)

Figure 15:
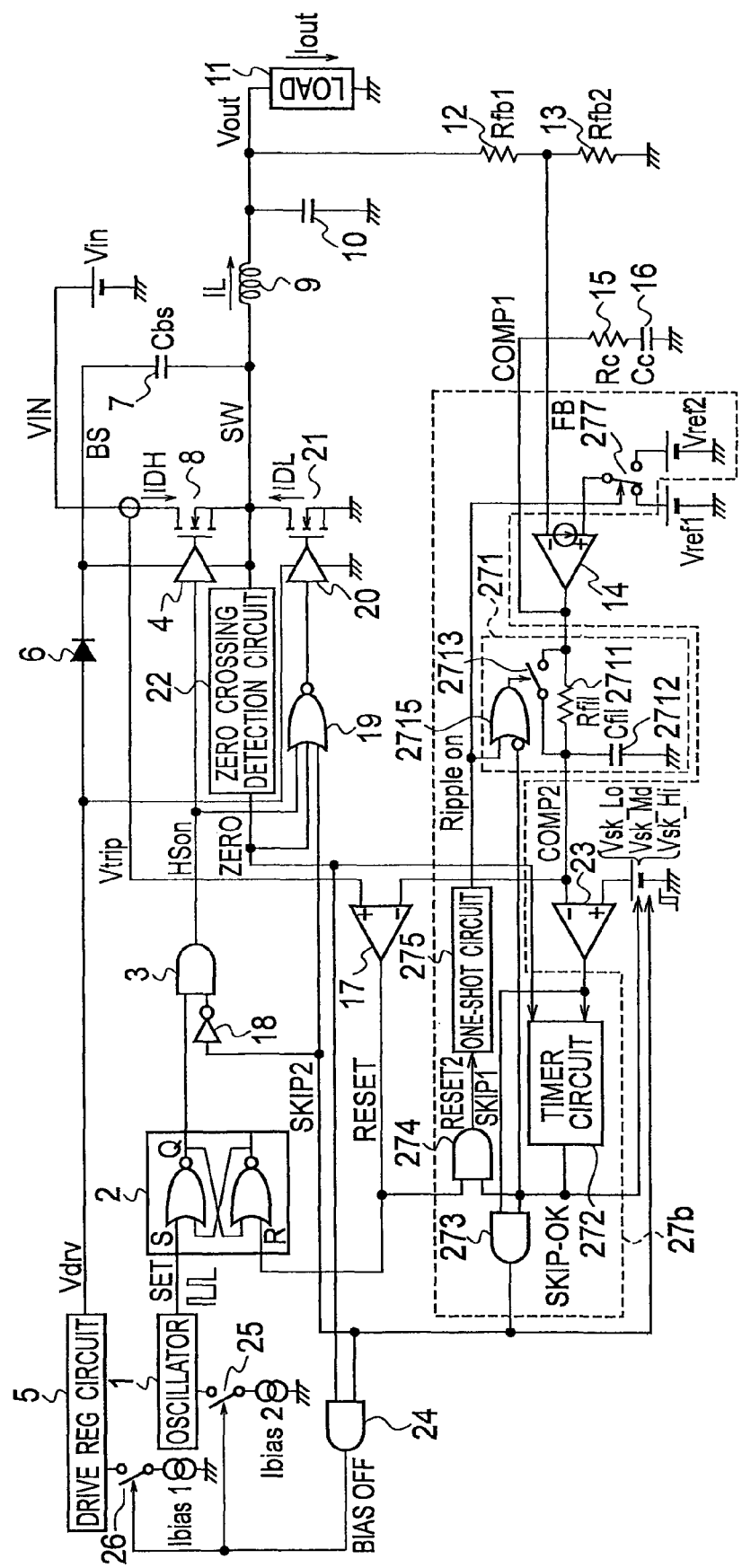
FIG. 15 is a circuit configuration diagram of a DC/DC converter of Embodiment 4 of the present invention.

FIG. 15 is a circuit configuration diagram of a DC/DC converter of Embodiment 4 of the present invention. The DC/DC converter of Embodiment 4 illustrated in FIG. 15 is characterized in that an AND circuit 24, a switch 25, and a switch are provided additionally to the DC/DC converter of Embodiment 3 illustrated in FIG. 13. Note that description of the same constituent components as those illustrated in FIG. 13 is omitted.

The AND circuit 24 is configured to AND the zero crossing signal of a zero crossing detection circuit 22 and the output of an AND circuit 273, and output the AND output as a signal BIAS_OFF to the switch 25 and the switch 26. The switch 25 is connected between an oscillator 1 and a bias source Ibias2. The switch 26 is connected between a drive REG circuit 5 and a bias source Ibias1.

As described above, according to Embodiment 4, the AND circuit 24 switches the signal BIAS_OFF from low to high during an oscillation OFF period in the intermittent oscillation operation and a period in which the regeneration of an inductor 9 is completed and the zero crossing signal is high. As a result, the switch 25 and the switch 26 are turned off and the oscillator 1 and the drive REG circuit 5 are stopped.

On the other hand, the AND circuit 24 switches the signal BIAS_OFF from high to low during an oscillation ON period in the intermittent oscillation operation. As a result, the switch 25 and the switch 26 are turned on and the operations of the oscillator 1 and the drive REG circuit 5 are resumed. Hence, the switching operations of a high-side MOSFET 8 and a low-side MOSFET 21 are resumed.

By repeating the above, the average of the current consumed in the circuit is reduced. Accordingly, the DC/DC converter of Embodiment 4 can further improve the efficiency in the light load state, as in Embodiment 3 illustrated in FIG. 13.

According to the present invention, the timer circuit outputs an intermittent operation permission signal after the elapse of a predetermined period of time based on the light load signal from the light load detection circuit and the zero crossing signal from the zero crossing detection circuit, and outputs an intermittent operation disabling signal in a case where a period without output of the zero crossing signal continues for a predetermined period of time. Specifically, when the output voltage is high, the light load threshold level determined by the light load detection circuit is lower than the light load threshold level determined by the zero crossing detection circuit, and therefore the light load detection circuit preferentially outputs an intermittent operation enabling signal. On the other hand, when the output voltage is low, the light load threshold level determined by the light load detection circuit is higher than the light load threshold level determined by the zero crossing detection circuit, and therefore the zero crossing detection circuit preferentially outputs an intermittent operation enabling signal. Thus, it is possible to disable an intermittent oscillation operation in a heavy load range without increasing the light load detection threshold even in a condition where the output voltage is low.

INDUSTRIAL APPLICABILITY

The present invention is applicable to switching power source devices.

What is claimed is:

1. A DC/DC converter configured to convert a first DC voltage into a second DC voltage by turning on and off a switching element in accordance with a drive signal generated by a control circuit, wherein
the control circuit includes:
an oscillator configured to output pulses at a predetermined frequency;
an error amplifier configured to amplify an error between the second DC voltage and a reference voltage and output an amplified error signal;
an inductor connected to the switching element and an output terminal of the second DC voltage;
a zero crossing detection circuit that outputs a zero crossing signal when a regeneration period of the inductor is completed;
a light load detection circuit that compares the amplified error signal from the error amplifier and a threshold of the light load detection circuit and outputs a light load signal;
a timer circuit comprising: an AND circuit that ANDs the light load signal from the light load detection circuit and the zero crossing signal from the zero crossing detection circuit, a predetermined period of time generation circuit that generates a first predetermined period of time and a second predetermined period of time in response to an output of the AND circuit, a signal switching unit that outputs an intermittent operation enabling signal after a high level of the output of the AND circuit continues for the first predetermined period of time and causes the threshold of the light load detection circuit to rise, and outputs an intermittent operation disabling signal after a low level is output from the AND circuit based on not receiving an output of the zero crossing signal from the zero crossing detection circuit that continues for the second predetermined period of time and causes the threshold of the light load detection circuit to lower; and
an ON-OFF control controller configured to turn off the switching element when the amplified error signal falls below the threshold while the timer circuit is outputting the intermittent operation enabling signal, and turn on the switching element when the amplified error signal at least reaches or exceeds the threshold while the timer circuit is outputting the intermittent operation enabling signal.

2. The DC/DC converter according to claim 1, wherein the threshold includes a first threshold, a second threshold larger than the first threshold, and a third threshold larger than the second threshold, and
the timer circuit selects the first threshold at a time of a shift from a steady oscillation operation to an intermittent oscillation operation, and selects any one of the second threshold and the third threshold at a time of a shift from the intermittent oscillation operation to the steady oscillation operation.

3. The DC/DC converter according to claim 2, wherein the timer circuit switches the first threshold to any one of the second threshold and the third threshold when the amplified error signal falls below the first threshold, and
the ON-OFF controller turns off the switching element when the amplified error signal falls below the second threshold, and turns on the switching element when the amplified error signal reaches or exceeds the third threshold.

4. The DC/DC converter according to claim 1, comprising:
a regulator circuit that drives the switching element; and
a drive stopper configured to stop at least the oscillator and the regulator circuit based on the zero crossing signal from the zero crossing detection circuit while the timer circuit is outputting the intermittent operation enabling signal.

5. The DC/DC converter according to claim 1, wherein the number of times switching is minimized by superimposing a ripple from a current source into the error amplifier during the predetermined period of time.

6. A DC/DC converter configured to convert a first DC voltage into a second DC voltage by turning on and off a switching element in accordance with a drive signal generated by a control circuit, wherein
the control circuit includes:
an oscillator configured to output pulses at a predetermined frequency;
an error amplifier configured to amplify an error between the second DC voltage and a reference voltage and output a first amplified error signal;
a low-pass filter circuit including an adjustment element that adjusts a time constant, the low-pass filter circuit that generates a second amplified error signal based on the first amplified error signal by use of the adjustment element;
a current detection circuit that detects a current flowing in the switching element and output a current signal;
a current comparator configured to compare the second amplified error signal and the current signal and output a reset signal for turning off the switching element, the reset signal being outputted based on an output of the comparison;
an inductor connected to the switching element and an output terminal of the second DC voltage;
a zero crossing detection circuit that outputs a zero crossing signal when a regeneration period of the inductor is completed;
a light load detection circuit that compares the second amplified error signal from the low-pass filter circuit and a threshold of the light load detection circuit and outputs a light load signal;
a voltage superimposition circuit connected to an input terminal of the error amplifier;
a timer circuit includes: an AND circuit that ANDs the light load signal from the light load detection circuit and the zero crossing signal from the zero crossing detection circuit, a predetermined period of time generation circuit that generates a first predetermined period of time and a second predetermined period of time in response to an output of the AND circuit, a signal switching unit that outputs an intermittent operation enabling signal after a high level of the output of the AND circuit continues for the first predetermined period of time and causes the threshold of the light load detection circuit to rise, and outputs an intermittent operation disabling signal after a low level is output from the AND circuit based on not receiving an output of the zero crossing signal from the zero crossing detection circuit that continues for the second predetermined period of time and causes the threshold of the light load detection circuit to lower; and an ON-OFF control controller configured to turn off the switching element when the second amplified error signal falls below the threshold while the timer circuit is outputting the intermittent operation enabling signal, and turn on the switching element when the second amplified error signal at least reaches or exceeds the threshold while the timer circuit is outputting the intermittent operation enabling signal, and the voltage superimposition circuit superimposes a voltage signal onto the input terminal of the error amplifier for a predetermined period of time, when the current comparator outputs the reset signal while the timer circuit is outputting the intermittent operation enabling signal.

7. The DC/DC converter according to claim 6, wherein the low-pass filter circuit reduces the time constant below a predetermined time constant by use of the adjustment element when the current comparator outputs the reset signal while the timer circuit is outputting the intermittent operation enabling signal.

8. The DC/DC converter according to claim 7, wherein the voltage superimposition circuit disables the superimposition of the voltage signal after an elapse of the predetermined period of time, and the low-pass filter circuit increases the time constant above the predetermined time constant by use of the adjustment element after the elapse of the predetermined period of time.

9. The DC/DC converter according to claim 6, wherein the threshold includes a first threshold, a second threshold larger than the first threshold, and a third threshold larger than the second threshold, and the timer circuit selects the first threshold at a time of a shift from a steady oscillation operation to an intermittent oscillation operation, and selects any one of the second threshold and the third threshold at a time of a shift from the intermittent oscillation operation to the steady oscillation operation.

10. The DC/DC converter according to claim 9, wherein the timer circuit switches the first threshold to any one of the second threshold and the third threshold when the second amplified error signal falls below the first threshold, and the ON-OFF controller turns off the switching element when the second amplified error signal falls below the second threshold, and turns on the switching element when the second amplified error signal reaches or exceeds the third threshold.

11. The DC/DC converter according to claim 6, comprising:

a regulator circuit that drives the switching element; and
a drive stopper configured to stop at least the oscillator and the regulator circuit based on the zero crossing signal from the zero crossing detection circuit while the timer circuit is outputting the intermittent operation enabling signal.

12. A DC/DC converter configured to convert a first DC voltage into a second DC voltage by turning on and off a switching element in accordance with a drive signal generated by a control circuit, wherein the control circuit includes:

an oscillator configured to output pulses at a predetermined frequency;

an error amplifier configured to amplify an error between a voltage corresponding to the second DC voltage and a reference voltage and output a first amplified error signal;

a low-pass filter circuit including an adjustment element configured to adjust a time constant, the low-pass filter circuit that generates a second amplified error signal based on the first amplified error signal by use of the adjustment element;

a current detection circuit that detects a current flowing in the switching element and output a current signal;

a current comparator configured to compare the second amplified error signal and the current signal and output a reset signal for turning off the switching element, the reset signal being outputted based on an output of the comparison;

an inductor connected to the switching element and an output terminal of the second DC voltage;

a zero crossing detection circuit that outputs a zero crossing signal when a regeneration period of the inductor is completed;

a light load detection circuit that compares the second amplified error signal from the low-pass filter circuit and a threshold of the light load detection circuit and outputs a light load signal;

a timer circuit comprising: an AND circuit that ANDs the light load signal from the light load detection circuit and the zero crossing signal from the zero crossing detection circuit, a predetermined period of time generation circuit that generates a first predetermined period of time and a second predetermined period of time response to an output of the AND circuit, a signal switching unit that outputs intermittent operation enabling signal after a high level from the AND circuit continues for the first predetermined period of time and causes the threshold of the light load detection circuit to rise, and output an intermittent operation disabling signal after a low level from the AND circuit-based on not receiving an output of the zero crossing signal from the zero crossing detection circuit that continues for the second predetermined period of time and causes the threshold of the light load detection circuit to lower; and an ON-OFF control controller configured to turn off the switching element when the second amplified error signal falls below the threshold while the timer circuit is outputting the intermittent operation enabling signal, and turn on the switching element when the second amplified error signal at least reaches or exceeds the threshold while the timer circuit is outputting the intermittent operation enabling signal, and the reference voltage of the error amplifier is lowered for a predetermined period of time, when the current comparator outputs the reset signal while the timer circuit is outputting the intermittent operation enabling signal.

13. The DC/DC converter according to claim 12, wherein the reference voltage includes a first reference voltage and a second reference voltage lower in voltage value than the first reference voltage, and the DC/DC converter comprises a switcher configured to switch the first reference voltage of the error amplifier to the second reference voltage for a predetermined period of time, when the current comparator outputs the reset signal while the timer circuit is outputting the intermittent operation enabling signal.

14. The DC/DC converter according to claim 12, comprising:
a regulator circuit that drives the switching element; and
a drive stopper configured to stop at least the oscillator and the regulator circuit based on the zero crossing signal from the zero crossing detection circuit while the timer circuit is outputting the intermittent operation enabling signal.

* * * * *